Dec. 16, 1941.   A. R. WILLARD   2,266,110
MATERIAL HANDLING AND CONVEYING MECHANISM
Filed Jan. 11, 1939   7 Sheets-Sheet 4

INVENTOR.
ALFRED R. WILLARD
BY
ATTORNEYS

Dec. 16, 1941.    A. R. WILLARD    2,266,110
MATERIAL HANDLING AND CONVEYING MECHANISM
Filed Jan. 11, 1939    7 Sheets-Sheet 5

INVENTOR.
ALFRED R. WILLARD
BY Kwis Hudson & Kent
ATTORNEYS

Dec. 16, 1941.  A. R. WILLARD  2,266,110
MATERIAL HANDLING AND CONVEYING MECHANISM
Filed Jan. 11, 1939  7 Sheets-Sheet 7

INVENTOR:
ALFRED R. WILLARD
BY Kwis Hudson Kent
ATTORNEYS

Patented Dec. 16, 1941

2,266,110

UNITED STATES PATENT OFFICE 2,266,110

MATERIAL HANDLING AND CONVEYING MECHANISM

Alfred R. Willard, East Cleveland, Ohio, assignor to Willard Storage Battery Company, Cleveland, Ohio, a corporation of West Virginia Application January 11, 1939, Serial No. 250,393

7 Claims. (Cl. 198—21)

This invention relates to material handling mechanism, and particularly to a so-called take-out mechanism, the purpose of which is to automatically remove from a conveyor or carrier rapidly traveling articles, especially relatively thin, flat articles, such as storage battery plates, which are generally conveyed rapidly and in close succession by a horizontal conveyor either directly from the pasting machine to the take-out mechanism or first through a heating and drying chamber positioned between the pasting machine and the take-out mechanism. In instances of this kind, it is generally desirable that the articles be removed from horizontal position on the traveling carrier and delivered to receiving rails or to more slowly moving conveyor chains in substantially vertical position and in relatively closely spaced relation, the rails or other receiving means generally extending at right angles to the direction of movement of the plates on the carrier.

The principal objects of the present invention are to provide a take-out mechanism of this character which does away with the necessity of manual removal of the plates or articles from the carrier with its numerous attendant disadvantages and which is an improvement over the take-out mechanisms which have been proposed heretofore in the way of greater simplicity, ease of timing, durability, and reliability.

In the accompanying sheets of drawings in which I have illustrated an embodiment of the invention which operates very effectively.

Figure 2:
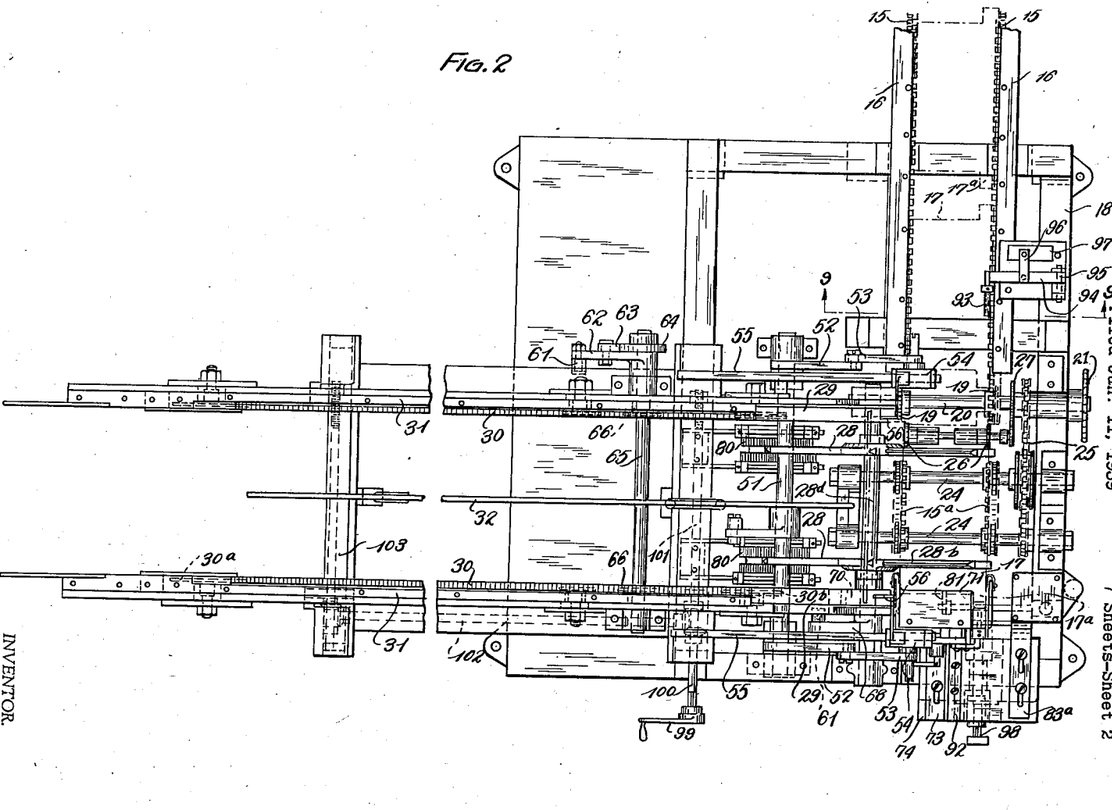
Fig. 2 is a top plan view of the same.
Figure 3:
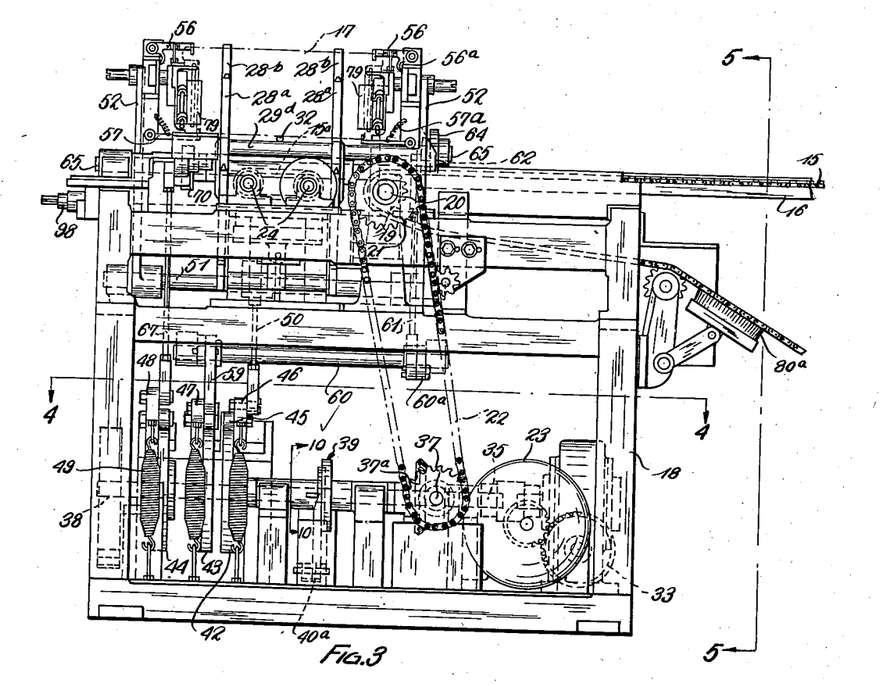
Fig. 3 is a view looking at the take-out mechanism toward the left of Fig. 2.
Figure 9:
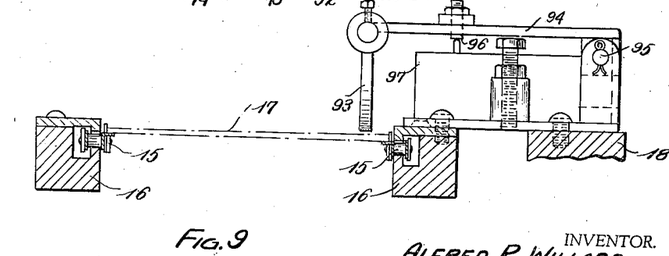
Fig. 9 is a detail sectional view also on an enlarged scale taken substantially along the line 9—9 of Fig. 2.

The articles handled by this machine are conveyed to the take-out mechanism by a horizontal conveyor consisting of two endless chains 15, the upper conveying portions of which are guided by horizontal guide rails 16 shown in Figs. 2, 3, and 9. The mechanism was designed particularly for handling double storage battery plates 17 which are indicated in Figs. 2 and 9, the plates being supported on the conveyor in horizontal position with their edges only engaging portions of the chains 15 which project through slots in the chain supporting and guiding rails 16.

The conveyor 15 generally extends from the pasting machine which fills lead or lead antimony grids with paste, and it may convey the plates through a suitable treating oven to cause the paste to become partially set and dried. The conveyor 15 travels continuously and at fairly high speed, and as the plates 17 are arranged quite close together on the conveyor, they are delivered at a rapid rate to the intermittently moving take-out mechanism which is adaptable for high speed operation. The rails 16 are arranged a suitable distance above the floor and at the delivery end of the conveyor they are supported by a frame designated generally by the reference character 18 and most clearly shown in Figs. 1, 2, and 3. This frame supports all the parts of the take-out mechanism as well as the driving mechanism for the conveyor chains 15 which, in this instance, pass over sprockets 19 secured to a drive shaft 20 provided at its outer end with a sprocket 21 engaged by a driving sprocket chain 22 which is driven by a motor 23 which, together with power-actuated members to be referred to presently, constitute a power unit which is mounted in the base or lower portion of the frame 18 beneath the take-out mechanism.

From the conveyor chains 15 the plates 17 are delivered onto a pair of short secondary conveyor chains 15a which, in effect, constitute a part of the conveyor and a continuation of the chains 15 as they are in line therewith and are constantly driven at the same speed as the chains 15, but are spaced therefrom for a purpose to be explained presently. The short secondary conveyor chains 15a travel about sprockets on a pair of horizontal shafts 24 and they are driven at the same speed as the chains 15 by a sprocket chain 25 engaging a sprocket on one of the shafts 24 and a sprocket on the drive shaft 20. To insure the delivery of the plates from the chains 15 to the chains 15a across the gap which separates them, I prefer to provide in this gap and close to the sprockets 19 on shaft 20 positively driven delivery rollers 26 mounted on a shaft driven by gearing 27 from the shaft 20. The peripheral speed of these rollers 26 is preferably slightly greater than the linear speed of the conveyor chains 15 and 15a so that they will actually speed up the movement of the plates 17 as they pass from the chains 15 to the chains 15a. This feature is provided as a precautionary measure against the possibility of the plates lagging as they leave the chains 15 and contact the chains 15a.

When the plates reach the end of their travel on the chains 15a they automatically set in operation, in a manner to be explained, the intermittently moving take-out mechanism which, in this instance, includes a take-out wheel 28 which is mounted on a shaft 28d at right angles to and slightly above the shafts 20 and 24. This take-out wheel consists of two spaced apart star wheels with radial arms which rotate in vertical planes or at right angles to the path of travel of the plates on the plate conveyor. In this instance each of the star wheels has eight plate-engaging and delivery arms, and during each intermittent movement of the take-out mechanism the star wheels travel through one-eighth of a revolution. However, the number of arms on the star wheels and the extent of their travel during each cycle are not material to the invention although the construction and the extent of movement described are preferred.

Figure 6:
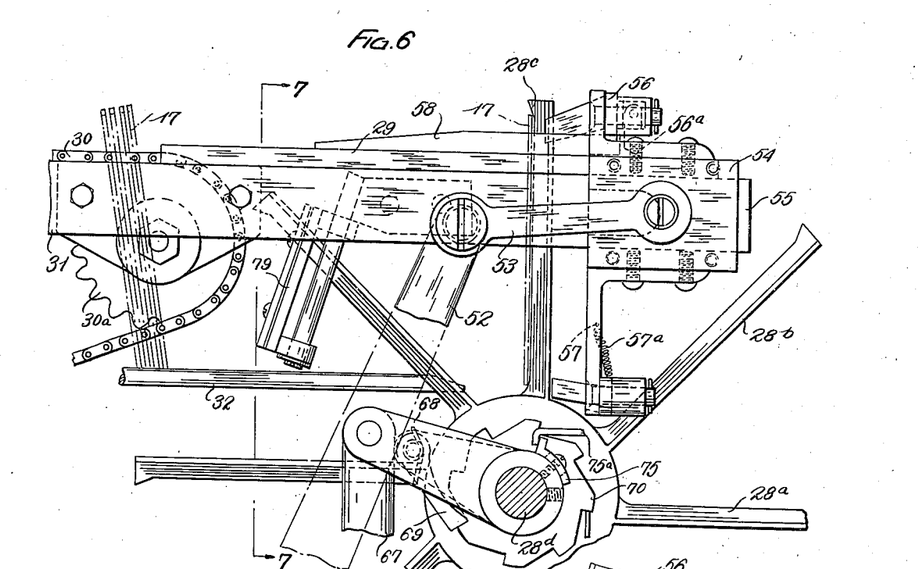
Fig. 6 is an enlarged detail view of part of the take-out mechanism, the parts being shown on an enlarged scale.
Figure 7:
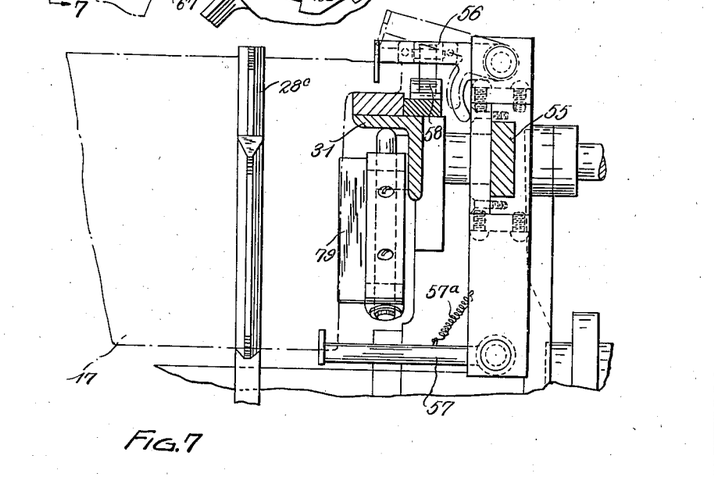
Fig. 7 is a transverse sectional view substantially along the line 7—7 of Fig. 6.

As will be seen by reference to Fig. 2, the arms of the star wheels are at opposite ends of the short secondary conveyor chains 15a, and when a plate is delivered onto the secondary chains 15a, two of the star wheel arms are at the horizontal position indicated at 28a in Fig. 6 just beneath the plate, and when the take-out mechanism is set in operation, these two arms engage and lift the plate off the chains 15a and during this cycle of operation they are moved from position 28a to the position indicated at 28b in Fig. 6. Thereupon the mechanism is stopped and, as it stops, the next pair of arms is in position 28a ready to lift the next plate in the succeeding cycle.

Figure 1:
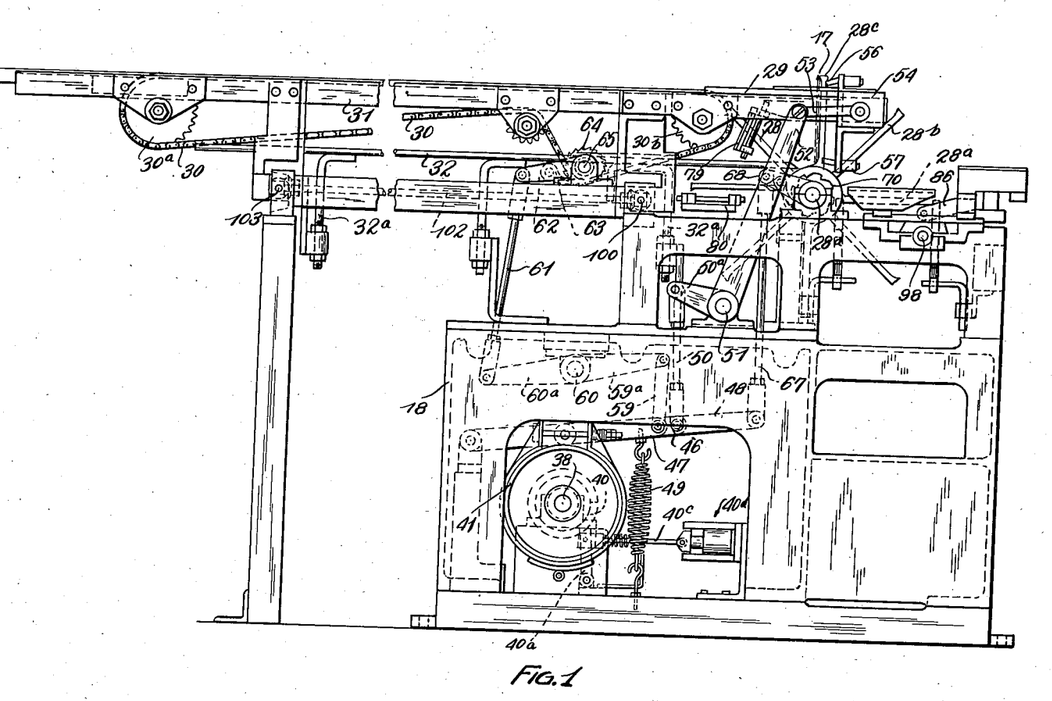
Fig. 1 is an end view of the machine.

The arms now supporting a plate 17 in position 28b in Fig. 6 are, in the next cycle, moved to the vertical position 28c, and as they are moved to this position they deliver the plate onto a pair of horizontal receiving rails 29 (Fig. 2) with the corner lugs of the plates engaging the rails 29 and with the body portions of the plates suspended between the rails. Mechanism which will be described presently is provided to slide the plates along these rails onto a pair of take-out chains 30 which are in line with and extend for a suitable distance forwardly from the receiving rails 29. The upper portions of the take-out chains 30 have supporting rails 31 carrying suitable sprockets 30a which are engaged by the chains 30, as best shown in Fig. 1. The inner sprockets 30b are adjacent to the outer ends of the receiving rails 29 but the rails 31 extend inwardly beyond the inner sprockets 30b and constitute a support for the receiving rails 29. The receiving rails 29 are short pieces of polished steel so that the plates can be readily slid along these rails and onto the chains 30, as will be explained presently.

When the plates are delivered onto the receiving rails 29 and then onto the take-out chains 30, the lugs 17a at opposite ends of the plates engage the rails and the chains with the body portions of the plates suspended in substantially vertical position. The chains 30 are moved forward a short distance at each cycle of the machine in a manner to be explained presently, with the result that the plates are spaced a short distance apart on the chains (see Fig. 6), thus enabling the plates to be cooled before it is necessary for the operator to touch them. Preferably the lower edges of the plates drag along a lower bar or rail 32 (see Figs. 1 and 6) which is held by adjustable supports 32a (Fig. 1) at the desired height midway between the chains 30 and the rails 29 (Fig. 2) so that the bottom edges of the plates will bear on and drag thereover, with the result that the plates, while traveling along the rails 29 and the chains 30, are maintained in a slightly inclined position as shown in Fig. 6. The purpose of this rail 32 is to prevent the plates from swinging as they are delivered onto the rails 29 and then onto the chains 30, thereby avoiding the likelihood of damage to the plates as would occur if they were permitted to swing into contact with each other.

The chains 30 and the rails 31 form a magazine that allows the plates coming from the take-out wheels to accumulate until there are sufficient to make a quantity large enough to be lifted out by the operator who piles them onto a truck or platform.

I will next consider the power unit of which the motor 23 is a part and which actuates all the intermittently moving parts of the take-out mechanism as well as the constantly moving conveyor chains 15 together with the short secondary conveyor chains 15a. Referring particularly to Figs. 1, 3, 4, 5, 10, and 11, it will be seen that the motor 23 through spur gearing 33 drives a shaft of reduction gearing in a gear case 34 from which extends a constantly rotating main drive shaft 35 (see Fig. 4). Through bevel gearing 36 this shaft drives a conveyor drive shaft 37 having at its outer end a sprocket 37a which drives the chain 22 which, in turn, drives with a constant motion the conveyor chains 15 and 15a.

Figure 4:
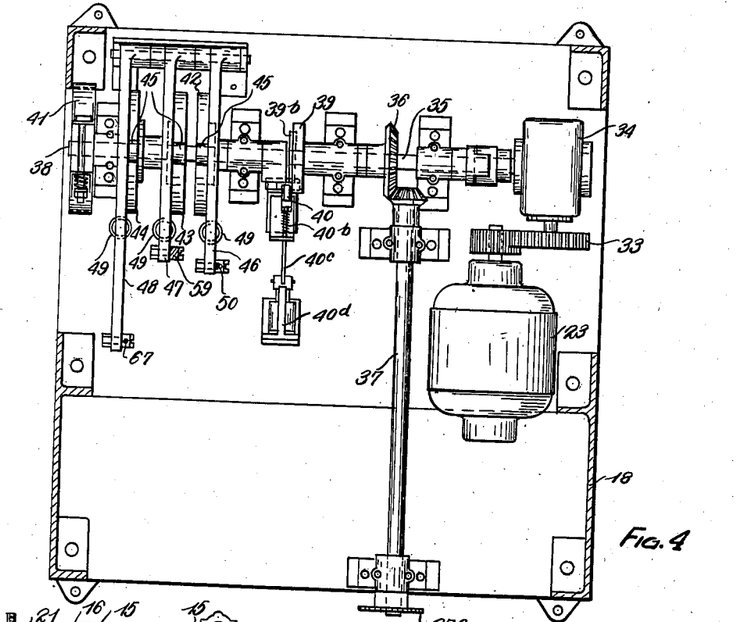
Fig. 4 is a sectional plan view of the power unit which is located at the lower part of the frame of the take-out mechanism, the view being taken substantially along the line 4—4 of Fig. 3.
Figure 5:
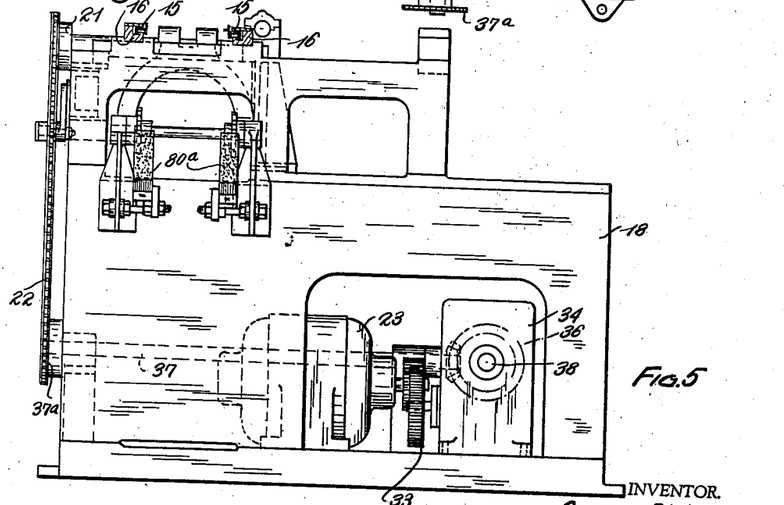
Fig. 5 is a sectional view substantially along the line 5—5 of Fig. 3.
Figures 10, 11:
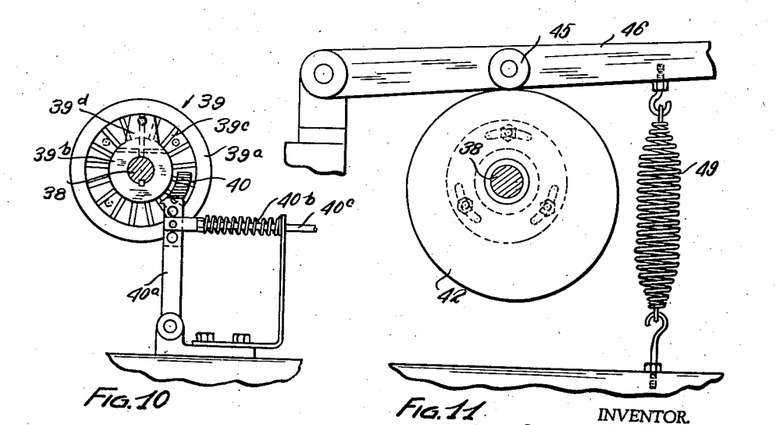
Fig. 10 is a detail sectional view of the clutch on an enlarged scale substantially along the line 10—10 of Fig. 3.
Fig. 11 is a fragmentary sectional view through the intermittently driven power shaft showing on an enlarged scale a detail of one of the cams for imparting intermittent movement to a part of the take-out mechanism.

In line with the shaft 35 is an intermittently actuated shaft 38 which is adapted to be clutched to shaft 35 through the medium of a clutch 39 shown conventionally in Fig. 4. I employ a clutch of the type which, when engaged, makes one revolution and is then automatically disengaged. Various forms of clutches of this kind are well known and are commonly employed on punch presses and the like. In Fig. 10 I have shown with some degree of detail a form of clutch which I have used very effectively. This includes a constantly rotating driving clutch member 39a and an intermittently rotated driven clutch member 39b, the former being secured to the constantly rotating shaft 35 and the latter to the intermittently rotated shaft 38. The driving member 39a has a plurality of closely spaced radial slots 39c while the driven member 39b carries a pivoted dog 39b which is spring-pressed inwardly and, when permitted so to do, engages in one of the slots or notches 39c so as to form the driving engagement between the clutch members. The engagement and disengagement of the clutch is controlled in this instance by a cam member 40 (Fig. 10) which normally lies closely adjacent to the slotted face of the driving clutch member 39a in position to cam the dog 39d out of a slot 39c. The cam member 40 is, in this instance, carried by a pivoted arm 40a which is normally held in the position shown in Fig. 10 by a spring 40b but is adapted to be momentarily shifted from that position, so as to allow the clutch to engage, by a link 40c connected to the plunger of a solenoid 40d shown in Fig. 1 which is adapted to be momentarily energized (in a manner to be explained) by each plate 17 as it reaches the end of its movement on the auxiliary or secondary conveyor chains 15a.

When the solenoid is energized, it retracts cam 40 allowing the dog 39d to drop into one of the slots 39c of the driving clutch member 39a, and when the driven clutch member 39b has made one revolution, the clutch is disengaged by reason of the fact that the cam 40 cams the dog 39d from the slot 39c of the driving clutch member 39a, the solenoid meanwhile having been deenergized. The intermittently driven shaft 38 is preferably provided with a suitable brake, indicated at 41 in Figs. 1 and 4, to prevent the driven clutch member from overrunning. As here shown, the brake is of the wheel and band type, but other types of brakes, such as one of the well known disk type, may be employed.

During each intermittent revolution of the shaft 38 a cycle of operations or series of intermittent movements is imparted to portions of the take-out mechanism. To accomplish this the shaft 38 is provided with three cams 42, 43, and 44 which are generally similar to the cam illustrated in Fig. 11, and they are capable of adjustment relative to each other so as to time the operations performed thereby. The peripheries of the cams are engaged by rollers 45 which are carried by substantially horizontally disposed levers 46, 47, and 48 which are normally biased downward with the corresponding rollers engaging the peripheries of the cams by coil springs 49, see Figs. 3, 4, and 11.

Figures 13, 14, 15:
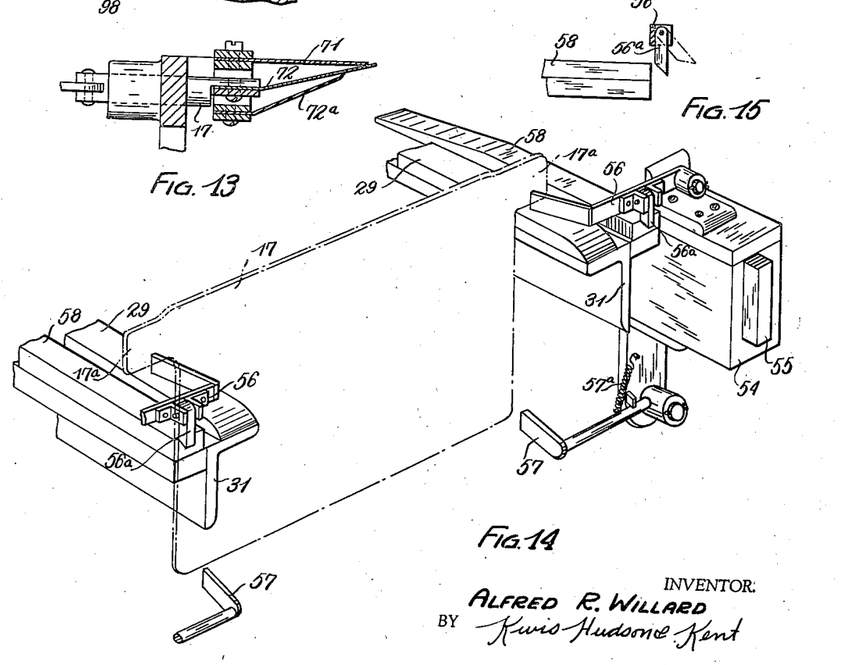
Fig. 13 is a fragmentary sectional view showing particularly certain blades for removing paste from the battery plates, this view showing the cleaner blade in a different position relative to the wiper blade than in Fig. 12.
Fig. 14 is an enlarged fragmentary perspective view showing particularly the mechanism for pushing the plates along certain take-out rails.
Fig. 15 is a fragmentary sectional view showing different positions of a latch associated with one of the pusher fingers of Fig. 14.

In the sequence of operations performed by these cams it is important that the plate 17 which is deposited on the rails 29 when the star wheel arms reach the position 28c of Fig. 6 be pushed forwardly off the rails onto the chains 30 or at least that this movement be initiated before the star wheels are given their increment of movement so as to prevent injury to the plate on the rails 29 by the arms as they swing downwardly from position 28c. Therefore, I so time the actions of the cams that the particular cam which is instrumental in accomplishing this result functions first in the sequence of operations. The cam used for this purpose is the cam 42 which actuates the lever 46. The outer or rear end of lever 46 is connected by a link 50, see particularly Fig. 1, to an arm 50a on a rock shaft 51 journaled on a suitable part of the frame 18. This rock shaft, which extends horizontally crosswise of the machine below and slightly forward of the star wheels, is provided at its opposite ends with two arms 52 (see Figs. 1 and 2) which are connected by links 53 to two crossheads 54 which slide on horizontal rails 55 which are supported in horizontal position by the frame 18 just outside the inner extensions of the chain rails 31 and outside the rails 29 on which the plates 17 are deposited by the star wheel and from which they are slid forwardly onto the take-out chains 30. Each of these crossheads carries an upper pivoted pusher finger 56 (see Figs. 1, 2, 3, 6, and 7) which extends inwardly and is adapted to engage the lug 17a at one of the upper corners of the plate and with a lower pivoted pusher finger 57 which extends inwardly and is adapted to engage one of the lower corners of the plate. Thus to slide the plate forwardly off the rails 29 onto the take-out chains 30, the plate standing on the rails is engaged and pushed forwardly by the four pusher fingers which engage the plate adjacent to its four corners, as shown in Figs. 3 and 14.

These four pusher fingers are pivoted to swing on horizontal axes so that when the crossheads and pusher fingers are returned they may pass by the upper corner lugs and the lower corners of the next succeeding plate which, meanwhile, has been brought to position 28c. I prefer that the upper pusher fingers 56 be positively elevated so as to clear the corner lugs of the plate in position 28c as the crossheads are returned to their rearmost positions. For this purpose I utilize cams 58 (see particularly Figs. 6 and 14) which are in the form of strips adjustably secured to the inner or rear extensions of the rails 31, these strips extending lengthwise of and just at the outer side of the rails, as indicated in Fig. 14. These cams, which have substantially horizontal rear portions and tapered forward portions, are engaged by latches 56a which are pivoted to the rear sides of the fingers 56, as shown in Figs. 14 and 15. They are free to swing rearwardly as shown by the dotted line position of the latch in Fig. 15 and they swing in this manner when the crossheads and pusher fingers are moving forwardly, at which time the latches ride freely over the top surfaces of the cams, but on the return movement of the crossheads and pusher fingers the latches come up against shoulders of the pusher fingers and become in effect locked to the fingers, with the result that on the return movement as the latches ride up on the elevated portions of the cams 58 they lift the fingers 56 so as to clear the corner lugs of the plate 17. When the crossheads reach their rearmost position, the latches drop off the rear ends of the cams 58 to the positions shown in Figs. 14 and 15 and allow the pusher fingers 56 to drop down behind the corner lugs of the plate 17 so that, on the next forward stroke of the crossheads, the pusher fingers are effective to move the plate 17 along the rails 29 onto the take-out chains. No special cams are provided to lower the fingers 57 on the return stroke of the crosshead. They are, however, cammed downwardly on the return stroke by engaging the lower portion of the plate 17 now in position 28c and then the inner ends of the fingers snap upwardly behind the plate ready for the next ejection operation. The upper fingers 56 are gravity-actuated to plate-engaging position while the lower fingers 57 are spring-actuated upwardly behind the plate, one of the springs 57a for this purpose being shown in Figs. 7 and 14.

The take-out chains 30 are given a short forward movement during each cycle of operations by the cam 43 whose associated lever 47 is connected by a link 59 to an arm 59a (Fig. 1) secured to a rock shaft 60 (Figs. 1 and 3) supported on a suitable part of the frame 18. Secured to one end of this rock shaft is an arm 60a connected by a link 61 (Fig. 1) to an arm 62 carrying a pawl 63 (see Fig. 2) which is adapted to actuate a ratchet 64 fixed to a cross shaft 65 mounted in the frame 18 and having a pair of sprockets 66 engaging the chains 30. It is immaterial at just what point in the cycle of operations this part of the mechanism functions, it being essential only that the chains 30 be given a step-by-step forward movement or one increment during each cycle so that the plates 17 will be spaced thereon a short distance apart, as already stated.

After the plate on the rails 29 has been moved forwardly a sufficient distance so as to be out of the range of movement of the star wheel arms as they swing downwardly from position 28c, the star wheels constituting the take-out wheel are actuated in this instance by giving them a one-eighth revolution. This is effected by the cam 44 whose associated lever 48 is connected by a link 67 to an arm 68 which is mounted to swing about the axis of the take-out wheel and which carries a pawl 69 which engages a ratchet 70 fixed to the shaft which supports the take-out wheel (see Fig. 6).

The freeing of the edges of the plates of excess paste is also an important function of the machine, and as one element of the paste removing mechanism is intermittently operated and functions in timed relation with the other intermittently movable elements heretofore described, this mechanism will be explained at this point.

The plates pass through the pasting machine in end-to-end relation in the same manner that they are positioned on the conveyor chains leading to the take-out mechanism, and, in consequence, the leading edge of each plate generally carries the major portion of the excess paste adhering to the edges of the plates. To remove this I provide a wiper blade 71 (see particularly Figs. 2, 8 and 12) which is flexible and which, together with the blades associated with it, is made of non-corrosive metal. This wiper blade is positioned in substantially a horizontal plane just above the plate 17 when it comes to a stop on the secondary conveyor chains 15a so that as the arms of the take-out wheel swing the plate 17 upwardly the forward edge portion of the wiper blade 71 will engage the forward edge of the plate 17 and wipe the paste from it.

As the paste would tend to collect on the wiper blade, I provide beneath the latter a reciprocating cleaner blade 72 which during each cycle of the machine is projected forwardly across the lower surface of the forward portion of the blade 71 so as to scrape the paste from its forward edge after each wiping operation by the blade 71. This cleaner blade 72 is projected forwardly from the position shown in Fig. 12 to the position shown in Fig. 13 to effect the cleaning operation and is then retracted again to the position shown in Fig. 12, and as it is retracted the paste is wiped from it by a stationary cleaner blade 72a which is located beneath it and constantly engages its lower surface. The stationary blades 71 and 72a are mounted upon a support 73, see Figs. 8 and 12, which is adjustably secured to a supporting plate 74 in turn adjustably mounted upon the main frame 18.

Figure 8:
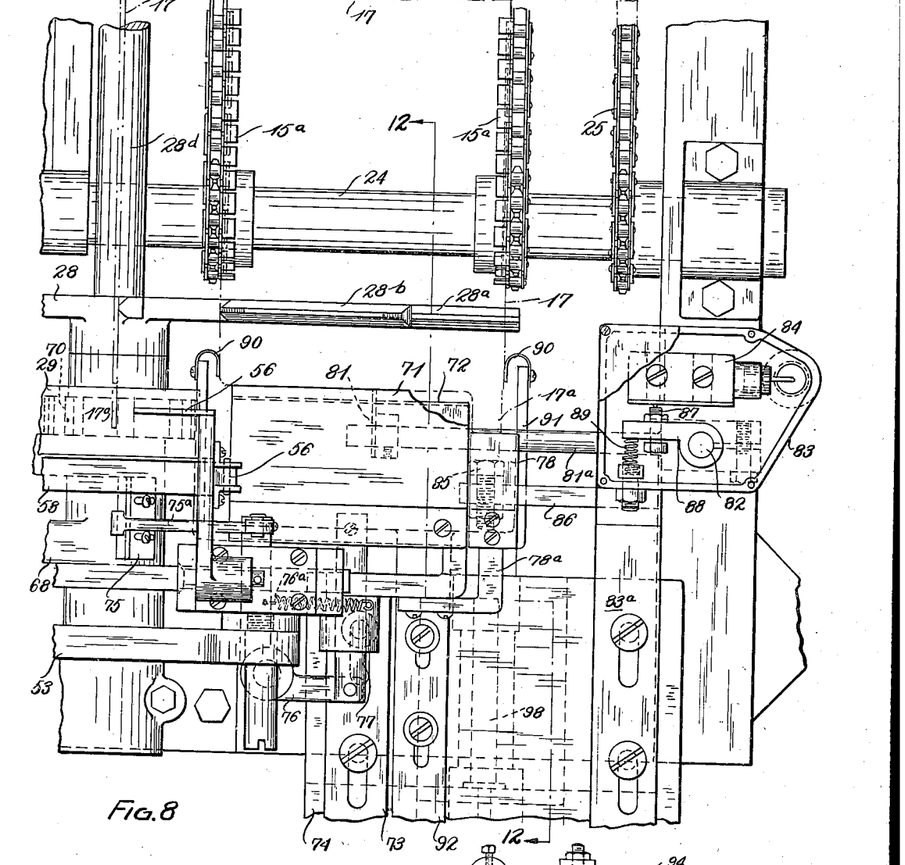
Fig. 8 is a top plan view on an enlarged scale of a portion of the take-out mechanism.

To reciprocate the cleaner blade 72, I provide on the hub of the arm 68 carrying the pawl which actuates the take-out wheel a plate 75 with an upstanding lip, see Figs. 6 and 8. Hooked over and engaging behind the lip of this plate is a downturned flange of a link 75a which is connected to one arm of a bell crank 76, see Fig. 8, mounted to turn on a vertical axis and connected by a link 77 to the rear portion of the cleaner blade 72. The bell crank is supported on an extension of the supporting member 73 which carries the two stationary blades 71 and 72a.

With this mechanism, when the arm 68 is swung downwardly, see Fig. 6, so as to cause its pawl 69 to turn the ratchet 70 and therefore the take-out wheel, the cleaner blade 72 is projected forwardly beyond the forward edge of the wiper blade 71. As the plate 17 is swung upwardly, the forward edge portion of the blade 71 wipes the paste from the edge of the plate, as pointed out above. On the return movement of the arm 68, the blade 72 and the mechanism for actuating it are retracted by a spring 76a (Fig. 8) one end of which is connected to the bell crank 76 and the other to a stationary point. With this mechanism the forward edges of the wiper blade 71 and of the cleaner blade 72 are freed of paste.

I prefer also to wipe the paste from the forward edge of the forward lug 17a of the plate 17, and for this purpose I provide a stationary flexible wiper blade 78 whose forward edge wipes the paste from the edge of the lug 17a when the plate 17 is swung upwardly. The stationary wiper blade 78 is mounted on an arm 78a carried by an arm projecting from the supporting member 73. Obviously, when the supporting member 73 is adjusted, it adjusts the positions of the blades 71, 72, and 72a and of the bell crank 76, as well as the position of the wiper blade 78.

It might be here stated that the upright edges of the plates 17 are also cleared of excess paste as they are moved along the take-up rails by contacting with flexible stationary wiper blades 79 (see Figs. 1, 3, and 6) suitably supported on the rear portions of the rails 31. The arms of the take-out wheel are freed of paste which tends to cling thereto by being caused to swing between wipers or brushes 80 (see particularly Fig. 2) suitably supported on the frame of the machine. Additionally, if desired, the chains may be cleared of paste by having the lower runs thereof pass over paste removing brushes 80a shown in Figs. 3 and 5.

Thus it will be seen that, during each cycle of the take-out mechanism, on the energization of the solenoid the plate on the take-out rails is pushed forward, the take-out wheel is rotated one-eighth of a revolution, the take-out chains are actuated, and the cleaner blade 72 is reciprocated, all as explained above.

These operations are performed quickly and more or less simultaneously, it being essential only that the pusher fingers start quickly enough to prevent the downwardly swinging arms of the take-out wheel from striking the plate on the take-out rails. That the series of operations occurs quickly will be readily appreciated when consideration is given to the fact that a machine constructed in accordance with this application functions very effectively with the plates being conveyed at the rate of sixty-one or more plates per minute, and with the moving plates on the conveyor spaced generally 3" to 4" apart. However, a higher speed of operation may be attained. As a matter of fact, the parts of the take-out mechanism are timed and operated at a speed such as to accommodate seventy-one plates per minute. This speed of the take-out mechanism is maintained even though less than seventy-one plates per minute are delivered by the conveyor chains 15 and 15a.

The energization of the solenoid and the initiation of the cycle of operations are controlled by the plates themselves, as already stated. To accomplish this I provide at a suitable distance in front of the secondary conveyor chains 15a a contact finger 81 (see Figs. 2, 8 and 12) mounted upon an inwardly extending horizontal arm 81a pivoted to turn on a vertical stud 82 journaled in a switch box 83 containing a switch 84 of standard construction. The finger 81 is engaged by the forward edge of the plate 17 in the manner indicated in Fig. 8, and, in so doing, the plate pushes the finger rearwardly and swings the arm 81a until it engages an adjustable stop 85 carried by an arm 86 extending inwardly from the switch box 83. The engagement of the arm 81a with the stop 85 stops the movement of the plate 17 on the secondary conveyor chains 15a and the swinging movement thus imparted to the arm 81a actuates the switch 84 by moving a switch actuating member 87 away from a cooperating actuating member of the switch 84, the actuating member 87 being carried by an arm 88 secured to the upper end of stud 82, as clearly shown in Fig. 8. This immediately starts the cycle of operations explained above, and as the plate 17 is lifted by the take-out wheel, the arm 81a and contact finger 81 are returned to normal position indicated in Fig. 6 by a spring 89, and meanwhile the next succeeding plate 17 on the conveyor is rapidly moved underneath the plate 17 being lifted by the take-out wheel and the operation is thereupon repeated.

The switch box 83 and the timing mechanism associated with it, including the arm 81a and the arm 86 carrying the adjustable stop 85, are carried by an adjustable member 83a secured to the adjustable support 74, see particularly Fig. 8.

Inasmuch as the plates 17 travel at a high speed on the conveyor chains 15 and 15a, it is desirable that the speed of the plates be checked somewhat just before the plates engage the finger 81. I accomplish this by causing the side edges of the plates just before they reach the end of their travel and just before they contact with the finger 81 to frictionally engage brake shoes 90 which are preferably formed from flexible metal. Only the forward portions of the side edges of the plates engage these brake shoes, as clearly shown in Fig. 8. In this manner the movement of the plates is slowed down sufficiently that they engage the finger 81 while traveling at such speed that there is no danger of an undesirable blow or shock being imparted by the plates to the timing or solenoid controlling mechanism. The brake shoes 90 are in this instance carried by the arms 91 of a fork which is attached to a supporting member 92 adjustably secured to the support 74.

If the plates 17 are in good condition, i. e., lie flat upon the conveyor, the machine functions continuously as above explained. However, occasionally plates are fed along the conveyor in such shape that they cannot be handled by the take-out wheel, resulting in the stopping of the plate at the entry to the wheel. Without some provision for avoiding congestion and piling up of the plates, a considerable number of the plates would be spoiled and therefore scrapped unless an operator were constantly in attendance to stop the machine should this occur. To avoid the necessity of this and at the same time to avoid the likelihood of spoilage of the plates, a so-called toucher bar 93 is mounted above the rails just in advance of the take-out wheel and with its lower end slightly above the plates as they are conveyed toward the take-out mechanism by the chains 15, as shown in Fig. 9. This toucher bar is carried by an arm 94 pivoted at 95 on the frame of the machine (see Figs. 2 and 9) and it carries a contactor 96 which engages a corresponding contactor of a standard form of switch 97 which also is mounted on the frame of the machine alongside the plate conveyor. If two plates pile up at this point, the toucher bar is elevated sufficiently to actuate the switch 97 which controls the motor circuit and instantly stops the motor and the entire machine. Thus the damaging of the plates for the reasons stated is reduced to a minimum.

Figure 12:
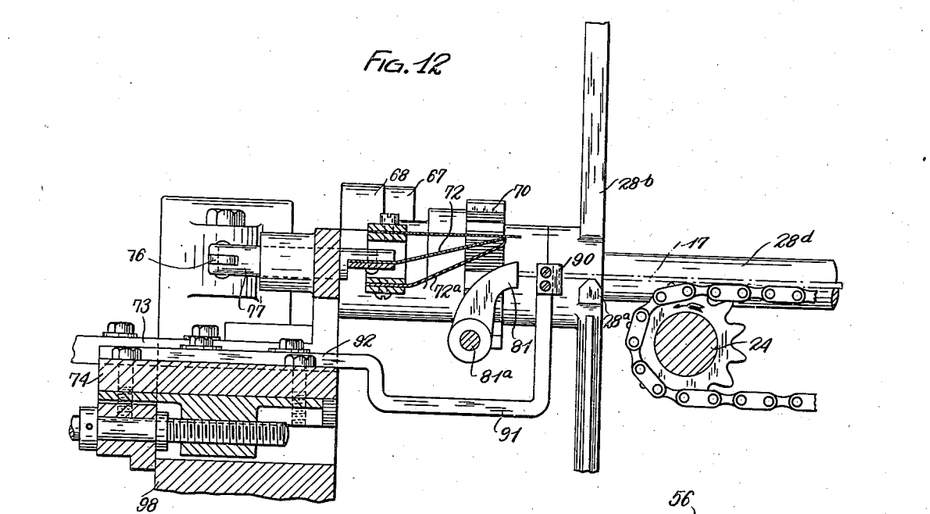
Fig. 12 is a sectional view taken substantially along the line 12—12 of Fig. 8.

Occasionally it is desired to run through the machine quantities of plates of different lengths. Provision is made in the machine disclosed herein for taking care of a situation of this kind. When plates of a different length than those for which the machine is set are to be run through, the position of the contact mechanism, the plate retarding means, and the wiper mechanism at the end of the machine where the travel of the plates is stopped on the secondary conveyor chains is changed. These mechanisms can be adjusted by loosening a series of set-screws which secure the support 74 to the frame 18 and applying a crank to the end of an adjusting shaft 98 (Figs. 2 and 12). Since the plates are supported by their corner lugs on the take-out rails 29 and on the take-out chains 30, it is necessary also that the distance between these rails and between the take-out chains be adjusted. This can be readily done by a crank 99 which is adapted to be applied to a shaft 100 which turns an adjusting screw 101 and is connected by bevel gearing and a shaft 102 (see Fig. 2) to a second adjusting screw 103. Of course, the contact mechanism, i. e., the mechanism for controlling intermittently the energization of the solenoid, can be independently adjusted by adjusting the supporting member 83a on the support 74. The same is true of the wiper and cleaner blades 71, 72, 72a, and 78 and of the brake shoes 90 since the supports 73 and 92 carrying these parts can be independently adjusted.

It is believed that the operation of the various parts of the machine will be understood from the foregoing description without a further connected description of the mode of operation and sequence of operations. While I have shown the preferred construction, I do not desire to be confined to the precise details shown but aim in my claims to cover all modifications which do not involve a departure from the spirit and scope of the invention. Furthermore, I do not desire that the invention be limited to a construction wherein storage battery plates are conveyed along the conveyor and handled by the take-out mechanism for many features of the machine constituting the subject matter of the invention are applicable to the conveying and handling of articles other than storage battery plates.

Having thus described my invention, I claim:
1. In combination, a conveyor for conveying flat articles, stationary take-out rails, a take-out conveyor adjacent to said rails, a take-out member for delivering articles from the first named conveyor to the rails, a pusher for sliding the articles along the rails onto the take-out conveyor, power means including a normally disengaged clutch for causing intermittent action of the take-out member, the pusher, and the take-out conveyor, and means controlled by the articles as they reach a predetermined position with respect to the take-out member for tripping the clutch.

2. In combination, a conveyor for conveying flat articles having lugs on two opposite edges thereof, stationary take-out rails, a take-out member for delivering the articles from the conveyor to the rails with the lugs of the articles resting on the rails and with the body portions of the articles suspended between the rails, means for moving the articles along the rails, and means controlled by the movement of the articles along said conveyor for intermittently actuating the take-out member and said moving means.

3. In combination, a conveyor for conveying flat articles having lugs on two opposite edges thereof, stationary take-out rails, a take-out member for delivering articles from the conveyor to the rails with the lugs of the articles resting on the rails and with the body portions of the articles suspended between the rails, reciprocatory means for moving the articles along the rails, and means controlled by the movement of the articles along said conveyor for intermittently actuating the take-out member and said reciprocatory moving means.

4. In combination, a conveyor for conveying flat articles having lugs on two opposite edges thereof, stationary take-out rails, a take-out member for delivering articles from the conveyor to the rails with the lugs of the articles resting on the rails and with the body portions of the articles suspended between the rails, means for moving the articles along the rails, and means controlled by the movement of the articles along said conveyor for intermittently actuating the take-out member and said moving means, said moving means having parts which engage the lugs of the articles and also the lower portions of the articles as the latter are suspended on the rails by the lugs.

5. In combination, a conveyor for conveying flat articles having lugs on two opposite edges thereof, stationary take-out rails, a receiving conveyor in line with said take-out rails, a take-out member for delivering articles from the first named conveyor to the rails with the lugs of the articles resting on the rails and with the body portions of the articles suspended between the rails, means for moving the articles along the rails, and means controlled by the movement of the articles along said first named conveyor for intermittently actuating the take-out member, said moving means and said receiving conveyor.

6. In a machine for handling articles with lugs at two corners thereof, a pair of rails spaced apart, means for intermittently and successively delivering the articles to said rails with the lugs resting on the rails and with the body portions extending in substantially vertical position between the same, and means for moving the articles along the rails, said moving means having parts which engage the lugs of the article last delivered to the rails and the body portion of said article beneath said lugs.

7. In a machine for handling articles with lugs at two corners thereof, a pair of rails spaced apart, means for intermittently and successively delivering the articles to said rails with the lugs resting thereon and with the body portions extending in substantially vertical position between the rails, and an intermittently movable reciprocatory pusher for moving the articles along the rails, said pusher having parts which during each forward motion of the pusher engage the corner lugs of the article last delivered to the rails and the body portion of the article beneath the lugs.

ALFRED R. WILLARD.